United States Patent

[11] 3,535,966

[72] Inventor Hewett J. Bascombe
  Birmingham, England
[21] Appl. No. 793,803
[22] Filed Jan. 24, 1969
[45] Patented Oct. 27, 1970
[73] Assignee Stafford Tool and Die Company Limited
  Stafford, England,
  a British Company
[32] Priority Jan. 30, 1968
[33] Great Britain
[31] 4,730/68

[54] CUTTING PRESSES
  10 Claims, 4 Drawing Figs.
[52] U.S. Cl. .................................................. 83/530,
  83/533
[51] Int. Cl. .............................................. B26d 7/26
[50] Field of Search ................................. 83/527—530,
  533

[56] References Cited
UNITED STATES PATENTS
3,178,983  4/1965  Brunson .................. 83/530
3,256,762  6/1966  Haas et al. ................ 83/530
FOREIGN PATENTS
645,970  7/1962  Canada ................... 83/530
1,070,790  2/1954  France ................... 83/530

*Primary Examiner*—William S. Lawson
*Attorney*—Sughrue, Rothwell, Mion, Zinn and Macpeak ABSTRACT: A pressure-sensitive device for effecting control of the movement of the platens of a power-operated cutting press which platens exert cutting pressure on a cutting die. The device utilizes the compression of a resilient sheet brought about by the cutting pressure to actuate adjustable switch elements. When the compression reaches a predetermined amount any one of the switch-elements will be actuated to initiate the return movement of the platens.

CUTTING PRESSES

BACKGROUND TO THE INVENTION

Hydraulically-operated cutting presses used for cutting sheet materials are well known. The sheet materials may be plastics, leather, knitted and woven materials for clothing, paper, composite board, asbestos, etc. and the presses serve to cut such material into particular shapes.

The cutting presses used in the application mentioned above generally possess cutting knives or dies which cut the material to the desired shape. The actual cutting depth of the cutters varies according to a variety of factors, namely:
 a. the thicknesses of the material to be cut,
 b. the general economics of manufacturing the cutters including their optimum size and weight, and
 c. the frequency of resharpening the cutters.

In general, the cutting presses have some means of adjustment for accommodating cutters of different cutting heights which adjustment is generally effected by the operator. However, the consequential time taken by an operator to adjust a press for a particular cutter height entails a loss in effective production time. Moreover, most presses employ a cutting pad onto which the material to be cut is laid and the cutting edges of the cutters generally cut slightly into the pad to ensure that a good, clean cut is made in the material. If the press is not correctly adjusted for the particular cutter height the pad would soon be ruined by continuous scoring and deep cuts.

In order to reduce the number of times a press must be adjusted it has been proposed hitherto to provide a number of replacement cutters each of standard height. However, the feature of having a cutter of standard height is only practicable when the cutter is new since when the cutter becomes worn or is resharpened a consequential reduction in height occurs. Again, if this reduction in height is not allowed for by correct adjustment of the press it is likely that due to incorrect adjustment the cutters would penetrate too deeply into the cutting pad which, of course, would soon result in the pad becoming ruined.

In order to ensure clean cutting the cutter pad must, moreover, be made of a harder material than the material which is being cut. Since the cutting edges of the cutters have to penetrate into the cutting pad after passing through the material to be cut the greatest wear to the cutting edges occurs when it enters into the cutting pad and frequent resharpening is therefore necessary.

A sophisticated device has been designed to reduce press adjustment wherein an electrical circuit is established when the cutter passes through the material to be cut. The making of the electrical circuit then causes the press to return to its original position. In this construction either a conductive cutting pad is used or a soft metal pad is layered with a strip of insulating material forming a cutter pad. Both the conductive cutting pad and the composite cutting pad are expensive to produce and owing to the time it takes for the control arrangement to return the press to its original condition, e.g. due to the operating time of relays, valves, oil pressure build up and decay, and the mechanical features of the press, the expensive cutting pads are still apt to be worn and their surfaces extensively cut. To avoid the expense of replacement of the cutting pad their upper surfaces can be skimmed by tools to provide a new working surface or in the case of a composite cutting pad the conductive plate can be resurfaced with the insulating material. This, however, is generally still uneconomic and time consuming.

An obvious further drawback of this construction is that the arrangement is useless when electrically conductive materials have to be cut or where materials become excessively damp since the cutter completes the electrical circuit before the cut has actually been made.

Further proposals have been made in order to dispense entirely with the use of cutting pads but in every case the press still needs to be adjusted to the appropriate cutter height. In one proposal of a press without a cutting pad the press incorporates a system of toggles which ensure that hydraulic control parts of the press stop the cutter at an identical point at the bottom of the stroke of the press. The cutter is then adjusted to just engage a steel cutting plate in order that wear to the cutting edges be minimal. However, this press still requires adjustment for the actual cutter height and moreover the construction of the press is complicated and involves a press bulkier than standard models and considerably more expensive.

A general object of the present invention is to provide a hydraulic cutting press which will allow press adjustment while mitigating the aforementioned disadvantages of the known constructions.

SUMMARY OF THE INVENTION

In or for a cutting press the invention provides a pressure-sensitive device for controlling the return movement of the platens of said press, said device comprising a sheet structure formed from a plurality of superimposed sheet members including a resilient sheet member, said sheet structure being disposed between the platens of the press such that the resilient sheet member is compressed by the cutting pressure of the press at least one switch element disposed in a cooperable relationship with said structure means for adjusting the position of the switch element relative, said sheet structure and control means actable to return the platens to a rest position whenever said switch element is actuated by compression of the resilient sheet member.

In a cutting press with a frame, upper and lower platens, means for moving the platens relatively of one another, a cutting die disposed between the platens for cutting a workpiece, and control means for controlling the operation of the means for moving the platens, the invention constitutes an improved device for operating said control means, said device having a sheet structure disposed between the platens, the sheet structure being formed from superimposed sheet members including a resilient sheet member which is compressed by the cutting pressure of the die, and switch elements each actuable when the compression of said resilient sheet member reaches a predetermined value, the operation of the control means to effect the return of the platens to their rest position when the desired treatment of the workpiece has taken place taking place when any of the switch elements is actuated.

One sheet of the structure may be a cutting plate onto which a workpiece to be cut by the press is placed. The structure can form, or lie upon, the lower platen of the press.

The switch element may be microswitches engageable by a striker plate operably connected to the structure by means of displaceable pressure pins.

A means is preferably provided for adjusting the position of the switch elements relative to the sheet structure in unison but each switch element is preferably also provided with a further mechanism for effecting its individual adjustment.

Various other aspects of the invention will become clearer from a consideration of a constructional embodiment thereof.

BRIEF DESCRIPTION OF DRAWINGS

A constructional embodiment of the present invention will now be described, by way of example only, with reference to the accompanying drawings wherein.

DESCRIPTION OF PREFERRED EMBODIMENT

Figure 1:
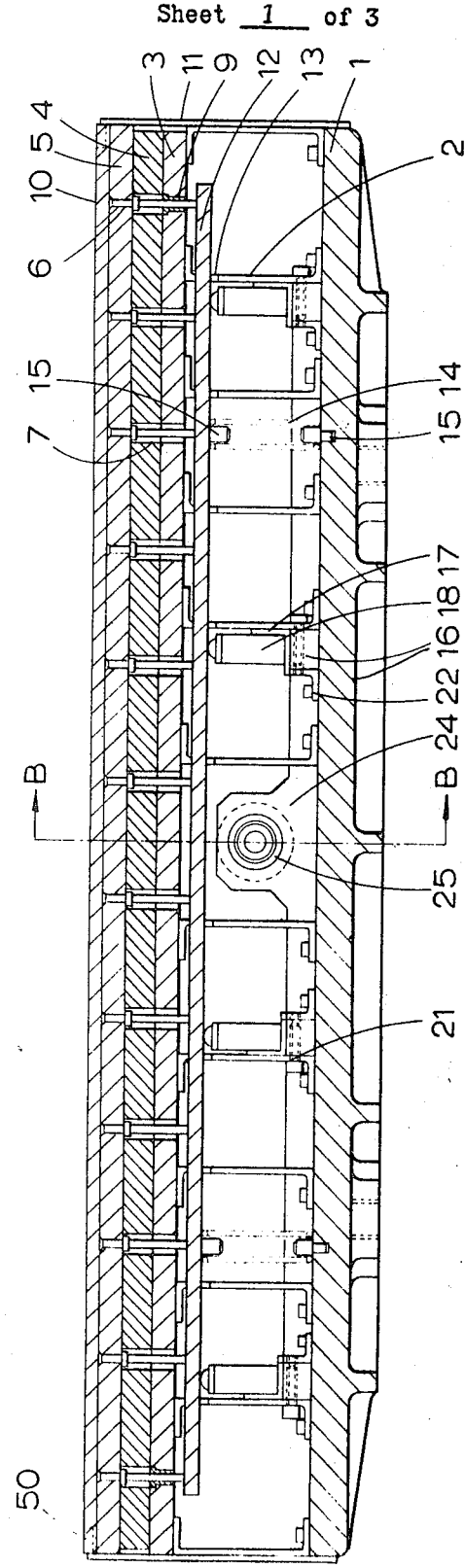
FIG. 1 is a front elevation of a cutting table of a hydraulic press provided with a device made in accordance with the present invention.

As shown in the drawings a cutting table or lower platen of a hydraulic cutting press is generally designated 1. A series of support elements 2 in the form of U-shaped channels are attached to the upper surface of the cutting table 1 so that the flanges thereof extend substantially parallel to the upper surface of the table 1. A first support sheet 3 in the form of a stout steel plate engages and rests on the upper surfaces of the upper flanges of the support elements 2 but is not attached thereto. A second support sheet 4 is superimposed upon the sheet 3 and the sheet 4 is made of a tough but resilient material such as rubber.

A pressure plate 5 in the form of a steel sheet is superimposed on the top of the sheet 4 and this plate 5 is provided with a series of pressure pins 6 projecting downwardly through co-axial clearance holes 7 provided in the sheets 3 and 4. The pressure pins 6 are preferably arranged symmetrically relative to the pressure plate 5 and convenient axial centres or locations for these pins 6 are shown in FIGS. 1 and 2 and are generally designated 8 in FIG. 2.

All or some of the clearance holes 7 in the sheet 3 are provided with guide bushes 9 which serve (a) to locate the position of the pressure plate 5 when assembly of the sheet structure is effected, (b) to prevent lateral movement of the plate 5 relative to the sheets 3 and 4 and (c) to prohibit binding of the pressure pins 6 in the clearance holes 7. The pressure pins 6 are made of sufficient length so as to protrude below the sheet 3 and into the space between the support elements 2. A cutting plate 10 overlies the pressure plate 5 and completes the sheet structure 3, 4, 5, 10 which structure is retained in alignment by means of plates 11 arranged at the sides, front and back of the cutting table 1.

Figure 2:
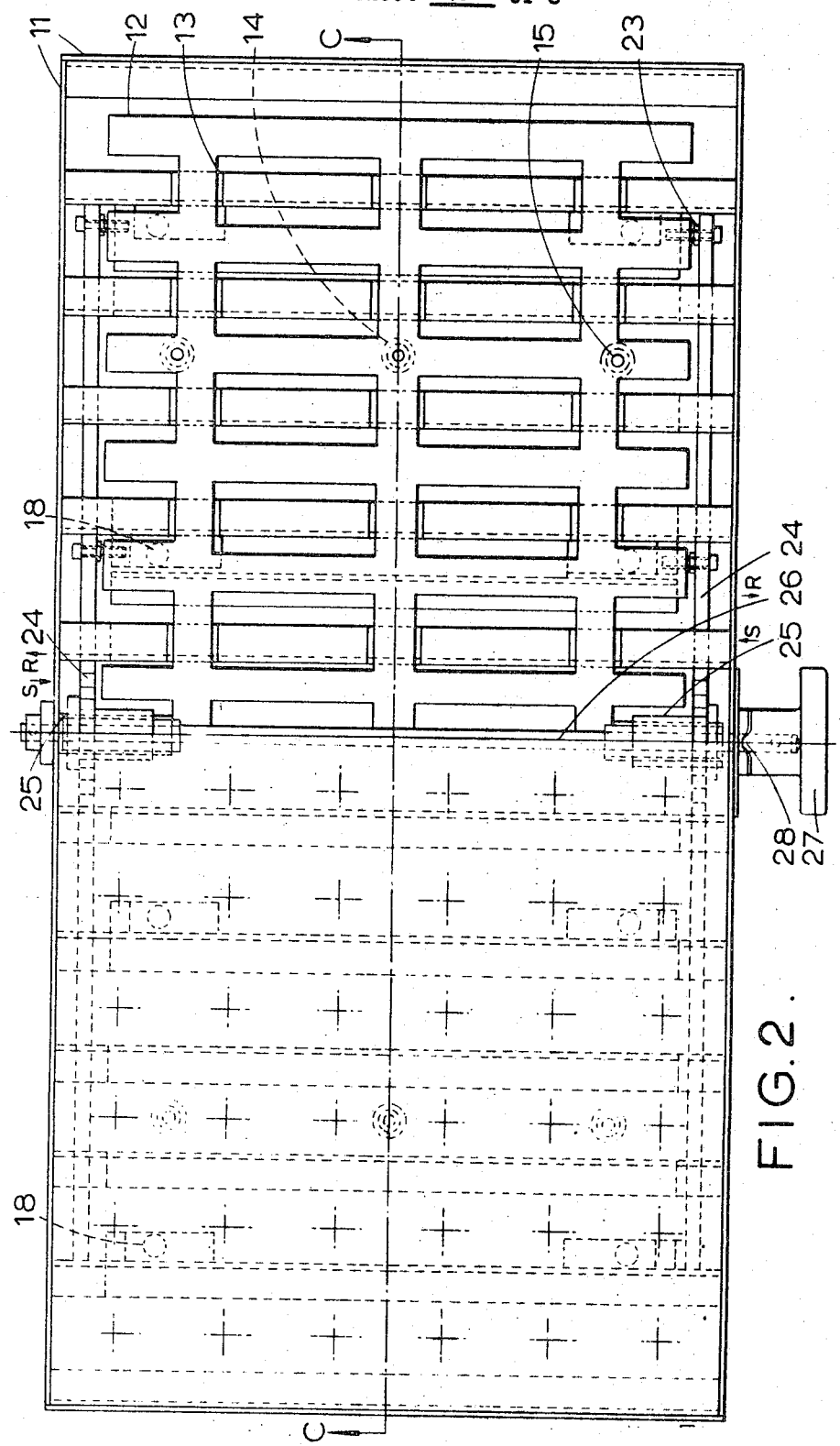
FIG. 2 is a plan view of the table shown in FIG. 1.
Figure 3:
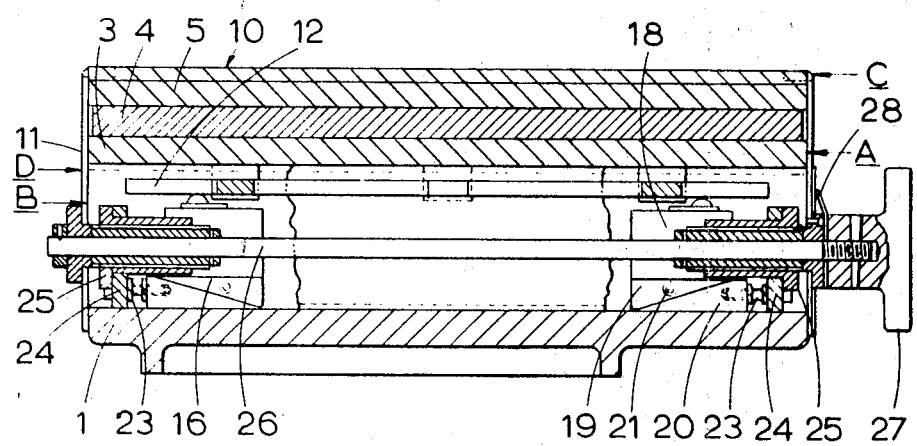
FIG. 3 is a side sectional elevation taken along the line B–B of FIG. 1.

The plates 11 are separable into upper and lower portions along a longitudinal line "B" (FIG. 2). The upper portions of the plates 11 are secured around the periphery of the sheet 3 as at "A", by means of screws (not shown) and their lower portions can be attached to the table 1. This construction will thereby permit the entire sheet structure or upper assembly 3, 4, 5 and 10 to be lifted en bloc from the supporting elements 2 thereby allowing access to the spaces enclosed by the lower portions of the plates 11 and the supporting elements 2.

A striker plate 12 is disposed beneath the sheet 3 and supported by springs 14 each located by coaxially arranged bosses 15 attached to the cutting table 1 and to the striker plate 12. The striker plate 12 and the upper portions of the support elements 2 are cut away, as shown at the right hand side of FIG. 2 at 13, to give the striker plate 12 a working clearance when it is displaced relative to the support elements 2. The springs 14 are made of sufficient length and have sufficient resilient force so as to hold the striker plate 12 firmly in contact with the lower ends of the pressure pin 6.

Figure 4:
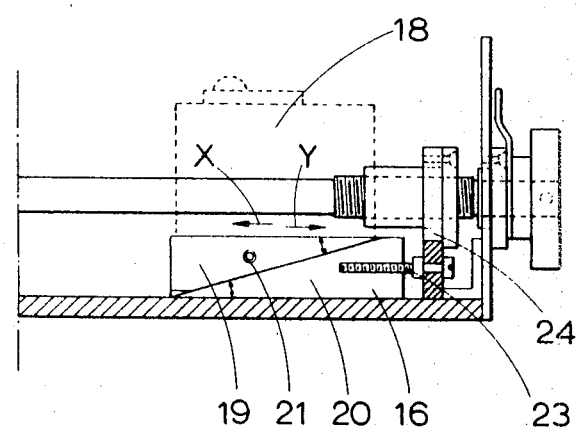
FIG. 4 is an enlarged view of a part of the press.

A series of adjustable mountings 16 are carried on the cutting plate 1 adjacent the vertical faces of certain of the support elements 2. A support member 17 is disposed on each mounting 16 and in turn carries a switch element in the form of microswitch 18 which is attached to the support 17 by means of spring clips or other fixing means (not shown). Each mounting 16 is adjustable in height and is formed by an upper wedge element 19 and a lower wedge element 20 having their inclined faces in engagement as shown more particularly in FIG. 4. A side face of the upper element 19 slidably engages the vertical face of an adjacent support element 2 and is held somewhat loosely to the support element 2 by means of a screw 21 which passes through a vertically elongated hole in the support element 2. Thus, the upper wedge elements 19 can be moved upwardly or downwardly relative to the cutting plate 1 by moving the lower wedge elements 20 laterally in the direction of arrow X or Y in FIG. 7. The lower wedge elements 20 are maintained in alignment with the upper wedge elements 19 by means of angle pieces 22 (FIG. 1). To displace the lowest wedge elements 20 the widest end of each lower wedge element 20 is connected by means of one or more adjusting screws 23 to one of two bars 24 disposed respectively at the front and back of the table 1. The adjusting screws 23 connecting the lower wedge elements 20 of the microswitch mountings to the adjusting bars 24 serve as vernier adjusters to these lower wedges 20. Thus, the microswitches 18 can be adjusted individually so that they all operate together and this arrangement can be readily appreciated by consideration of FIG. 4. The position of the bars 24 themselves can best be seen in FIG. 2. The bars 24 are each provided with at least one bush 25 having an internal screw thread. The thread of the bush 25 at the front is right hand and the thread of the bush at the back is left hand or vice versa.

A threaded spindle 26 extends through the aligned bushes 25 and is supported in further bushes provided on the front and back plates 11. The spindle 26 is provided with a hand wheel 27 and can be rotated thereby to displace the bars 24 and the wedge elements 20 connected thereto in the direction of arrow R or S in FIG. 2. The hand wheel 27 carries a pointer or similar indicating element 28 which registers against a suitably calibrated scale (not shown) located on the front plate 11.

The operation of the press will now be described. By turning the hand wheel 27 the threaded spindle 26 causes the bars 24 to either move towards one another (arrow S) or away from one another (arrow R) according to the direction of rotation of the hand wheel. The relative movement of the bars 24 serve to move the lower wedge elements 20 and the adjustable mountings 16 to thereby raise or lower the microswitches 18.

The die or cutter of the press (not shown) engages the cutting plate 10 when cutting material and will cause the resilient sheet 4 to compress thereby resulting in a deflecting movement being imparted to the pressure plate 5. This deflection is transmitted through the pressure pins 6 to cause a downward movement of the striker plate 12 to engage the microswitches 18. The microswitches 18 are adapted to operate a control circuit or mechanism to return the press to its former position. In particular, the microswitches 18 are connected in parallel with one another and in series with a control relay (not shown). The control relay operates upon actuation of any of the microswitches 18 and is used to cause a return valve to operate so as to transmit hydraulic pressure medium to raise the upper platen of the press. Thus, if any of the microswitches 18 is operated the press will be automatically returned to its original position.

The position of the microswitches 18 is effectively controlled by rotation of the hand wheel 27 and if the microswitches 18 are lowered a greater pressure must be exerted by the press before the resilient sheet 4 is compressed sufficiently to actuate any or all of the microswitches 18. Conversely, by raising the microswitches 18 less pressure is required to operate them.

The significance of this feature will be appreciated when one considers cutting an unbacked plastic sheet, for instance, where a relatively light cutting pressure is required and contrasts this with a hardboard or insole board where a relatively heavy pressure is needed. The correct selection of the material of the resilient sheet 4 ensures that its compression from zero to a maximum pressure, corresponding to that required for such materials as hardboard etc., can be measured in thousands of an inch. A typical FIG. is in the order of 65 to 75 thousands of an inch. Also, by employing the correct number of turns per inch on the spindle 26 and the bushes 25 the microswitches 18 can be adjusted effectively from zero to a maximum cutting pressure setting by turning the hand wheel 27 through an angle in the order of 320 angular degrees. These features make the setting of the press for a particular material extremely rapid. The scale carried by the front plate 11 and adapted to cooperate with the pointer can be marked with designations such as zero, very light, light, medium, heavy, very heavy and maximum or similar notations corresponding to the setting pressure or numerical data can be placed on the scale corresponding to the correct setting for any given material.

It can be appreciated that if a material to be cut is laid on the cutting plate 10 and a cutter placed on it with its cutting edge downwards the position of the microswitches 18 can be adjusted so that only the exact pressure required to pass the cutting edge through the material is set. The cutting edges of the cutter will thereby just engage the steel cutting plate 10 and the press will be automatically returned to the top of its stroke when the microswitches 18 operate and no excess pressure will be required to complete the cut as was the case where a cutting pad is employed. Consequently the cutting plate 10 can have a virtually limitless life.

Moreover, since the operation of automatically returning the press is instigated by pressure alone a cutter can be placed with the cutting edges upwards and the material to be cut placed on top of the cutting edges. The operation of the press to make the cut will still take place under the control of the pressure sensitive device and its reaction will be identical to the conventional manner of arranging the cutter.

The plates 11 can be lipped as at 50 in FIG. 1 and thus secured to the lower part of the sheet structure or assembly thereby allowing the whole assembly to be inverted to form a pressure sensitive device on the upper platen of a press rather than the lower platen.

It will also be appreciated that when cutting a given material and using cutters of varying linear cutting lengths different pressures will be required for the differing lengths. This problem can easily be overcome since the microswitches 18 can be individually adjusted by means of the adjusting screws 23 to operate at different pressures.

Tests have shown that for softer materials the compression of the semiresilient sheet 4 was generally very small and the movement of the striker plate 12 necessary to operate the microswitches 18 was consequently very small also. When replacing cutters it was found that the resulting variation in movement of the striker plate 12 was minute and that for a wide range of materials covered by the first half of the pressure scale no further adjustment for these slight variations was required. When using varying sizes of cutters on hard or very hard materials, as covered by the second half of the scale, a certain further adjustment for the varying pressure does in fact become necessary; but again these adjustments can be suitably calibrated particularly as in normal practice a press operator does not usually handle such a wide range of materials.

As is apparent from the foregoing provided the press has sufficient maximum stroke to clear the deepest cutter and deepest depth of material any depth cutter within these limits can be used with equal facility without adjusting the press for the particular cutter depth. It is also apparent that conductive materials can be cut without difficulty because the control mechanism is pressure sensitive not electrically sensitive as in some prior art arrangements.

The microswitches 18 should generally operate at the same pressure and the adjusting screws 23 can be used to ensure that this is so. For adjustment purposes the bosses 25 carried by the adjusting bar 24 can be made relatively long to ensure that the bars are always square with the operating spindle 26.

A press constructed in accordance with the invention has the following advantageous features:

a. The press can be used with any depth of cutter commensurate with general cutting practice without the need of adjusting the press for varying cutter heights This relieves the operator of responsibility and tends to increase production times.
b. The press dispenses with the use of conventional cutting pads or matrices since the cutter is allowed to engage a steel cutting blade with only a very light "Kissing" pressure. This results in a considerable saving of outlay both in the initial cost of cutting pads and in their continued maintenance. Moreover, this results in reduced cutter wear and a consequential saving in outlay in respect of resharpening of the cutters.
c. The pressure sensitive device can be incorporated into an existing hydraulic press without difficulty and the design of a new press is not complicated by the presence of the assembly

I claim:

1. In or for a cutting press a pressure sensitive device for controlling the return movement of the platens of said press, said device comprising a sheet structure formed from a plurality of superimposed sheet members including a resilient sheet member, said sheet structure being disposed between the platens of the press such that the resilient sheet member is compressed by the cutting pressure of the press at least one switch element disposed in a co-operable relationship with said structure, means for adjusting the position of the switch element relative to said sheet structure and control means actable to return the platens to a rest position whenever said switch element is actuated by compression of the resilient sheet member.

2. A device according to claim 1, wherein the structure includes a sheet member which forms a cutting plate for the press.

3. A device according to claim 1, wherein a plurality of switch elements is provided and a striker plate is operably engageable with the switch elements and contacts axially-movable pins which effect displacement of the striker plate according to the compression of the resilient sheet member 4. A device according to claim 3, wherein there is provided means for adjusting the position of all the switch elements relative to the sheet structure.

5. A device as claimed in claim 4, wherein said means includes mechanisms which can each be individually adjusted to control the position of the associated switch element relative to the other switch elements.

6. A device according to claim 3, wherein the sheet structure includes a first rigid sheet member a cutting plate and a pressure plate, the resilient sheet member being disposed between the first sheet member and the pressure plate and the cutting plate being superimposed on the pressure plate 7. A device according to claim 6, wherein the pressure plate carries the axially-movable pins each of which extends through coaxial clearance holes in the resilient sheet member and the first sheet member, and the striker plate is urged into contact with the lower ends of the pins by spring means.

8. A device according to claim 1, wherein the switch element is a microswitch.

9. A device according to claim 5, wherein the mechanisms each include two wedge elements having their inclined faces in engagement, one of the wedge elements carrying the associated switch element and the other wedge element being displaced to effectively raise or lower said switch element.

10. In a cutting press with a frame, upper and lower platens, means for moving the platens relatively of one another, a cutting die disposed between the platens for cutting a workpiece, and control means for controlling the operation of the means for moving the platens, an improved device for operating said control means, said device having a sheet structure disposed between the platens, the sheet structure being formed from superimposed sheet members including a resilient sheet member which is compressed by the cutting pressure of the die, and switch elements each actuable when the compression of said resilient sheet member reaches a predetermined value, the operation of the control means to effect the returns of the platens to their rest position when the desired treatment of the workpiece has taken place taking place when any of the switch elements is actuated.